April 14, 1953

R. E. HADADY 2,635,225

MANUALLY SETTABLE TEMPERATURE-SENSITIVE BRIDGE CIRCUIT

Filed June 23, 1949

INVENTOR.
ROBERT E. HADADY
BY Herman L. Gordon
ATTORNEY

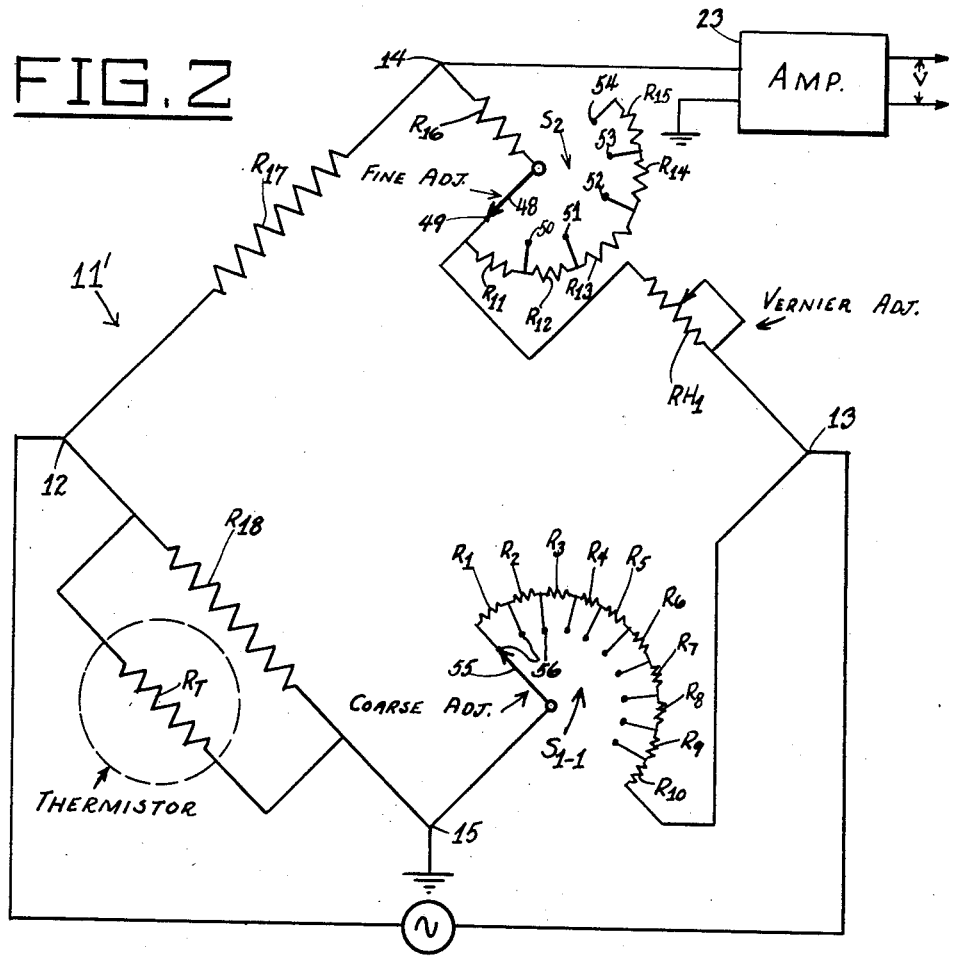
FIG. 2
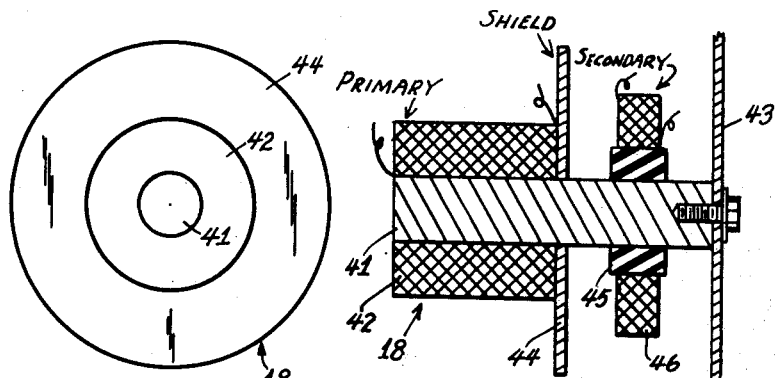
FIG. 5
FIG. 6
INVENTOR.
ROBERT E. HADADY
BY Herman L. Gordon
ATTORNEY April 14, 1953   R. E. HADADY   2,635,225
MANUALLY SETTABLE TEMPERATURE-SENSITIVE BRIDGE CIRCUIT
Filed June 23, 1949

INVENTOR.
ROBERT E. HADADY
BY Herman L. Gordon
ATTORNEY

Patented Apr. 14, 1953

2,635,225

UNITED STATES PATENT OFFICE 2,635,225

MANUALLY SETTABLE TEMPERATURE-SENSITIVE BRIDGE CIRCUIT

Robert E. Hadady, Silver Spring, Md., assignor to The American Instrument Company, Inc., Silver Spring, Md., a corporation of Maryland Application June 23, 1949, Serial No. 100,936

7 Claims. (Cl. 323—69)

This invention relates to temperature-responsive bridge circuits, and more particularly to a bridge circuit of the temperature-sensitive type which may be manually set to give a null response at any predetermined temperature over a wide range.

A main object of the invention is to provide a novel and improved temperature-sensitive bridge circuit of the manually settable type which has substantially constant voltage sensitivity at any temperature for which it is adjusted to provide a null condition, whereby it may be employed to control heating devices and the like to maintain the space in which the temperature-sensitive element of the circuit is located at a desired constant temperature.

A further object of the invention is to provide an improved temperature-sensitive bridge circuit of the manually settable type wherein means are provided to automatically compensate the circuit for operation at extreme temperatures so that the temperature sensitivity thereof will remain substantially constant at any set temperature over a very wide range.

A still further object of the invention is to provide an improved temperature-sensitive alternating current bridge circuit of the settable type wherein improved capacity-balanced voltage supply means is provided, minimizing errors in operation due to unbalanced capacitive reactance across the arms of the bridge circuit.

A still further object of the invention is to provide an improved temperature-responsive settable control device which is simple in construction, precise in operation, and easy to manipulate.

Further objects and advantages of the invention will become apparent from the following description and claims, and from the accompanying drawings, wherein:

Figure 2 is a schematic diagram of an improved temperature-responsive settable bridge circuit according to the present invention.

Figure 5 is an end elevational view of an isolation transformer employed at the input of the improved temperature responsive device of the present invention.

Figure 6 is a longitudinal cross-sectional view taken through the transformer of Figure 5.

Figure 4:
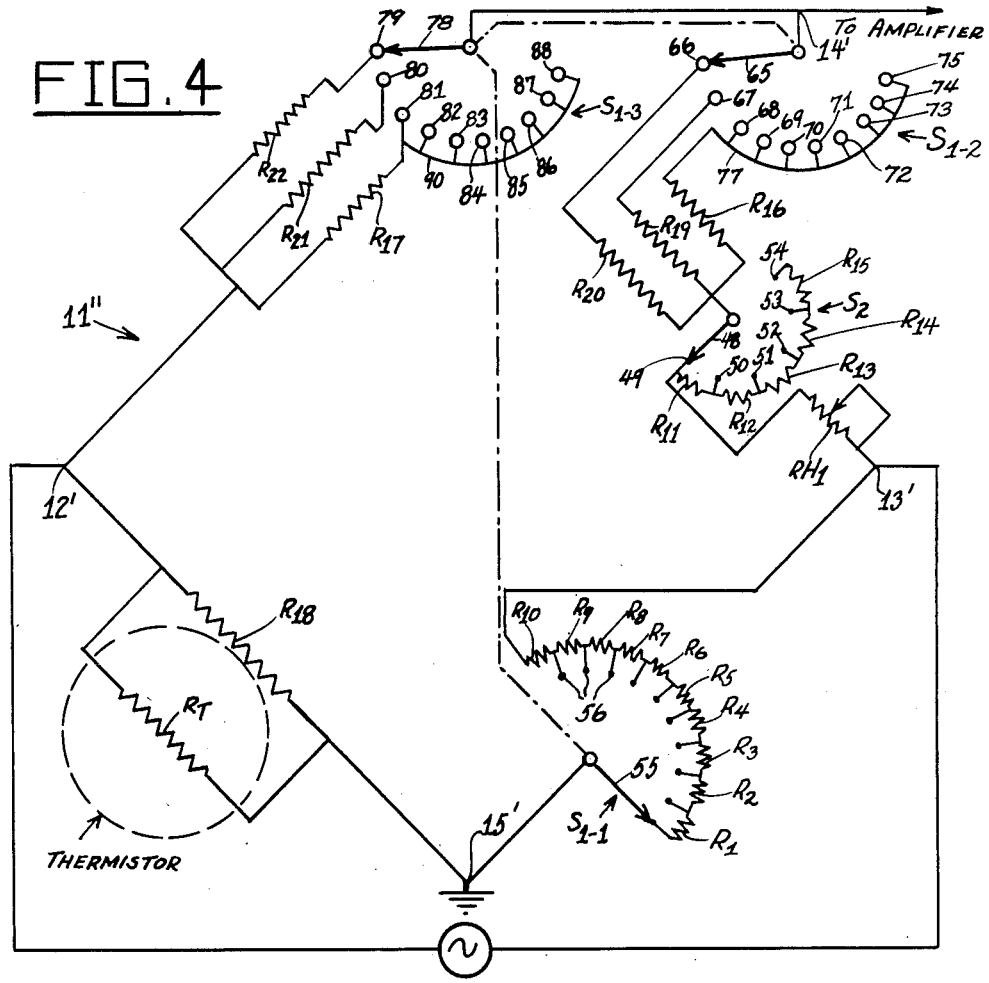
Figure 4 is a schematic diagram of a modified form of temperature-responsive bridge circuit according to the present invention.
Figure 7:
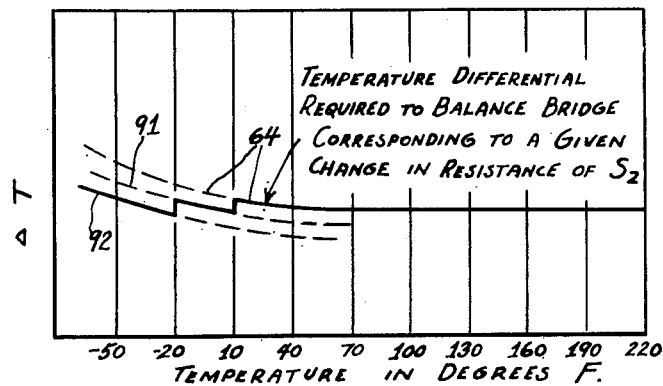

Figure 7 is a graph representing the fine adjustment characteristic of the temperature-responsive settable bridge circuit of Figure 4 at different settings over the range of temperature values covered by said settable bridge circuit, said characteristic representing the temperature differential at various temperatures required to balance the bridge, corresponding to a given change in setting of the fine adjustment element of the bridge.

Figure 1:
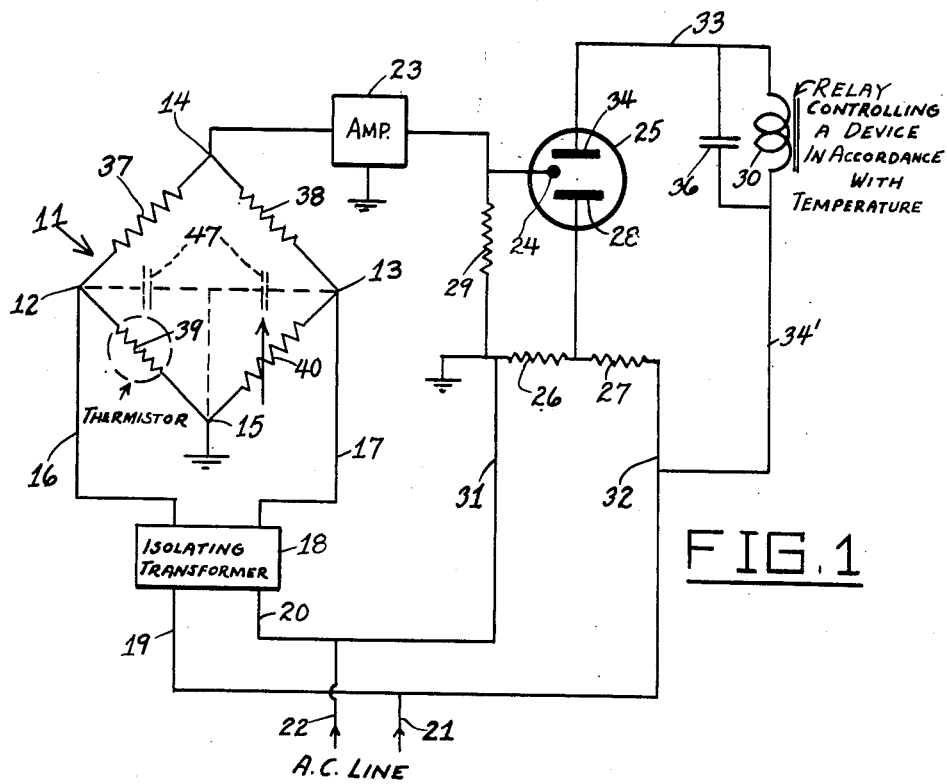
Figure 1 is a schematic circuit diagram of a conventional temperature responsive settable control circuit of the type wherein an improved bridge circuit of the present invention may be employed.

Referring to the drawings, and more particularly to Figure 1, 11 generally designates a bridge circuit having input terminals 12 and 13 and output terminals 14 and 15. Connected to input terminals 12 and 13 by respective wires 16 and 17 are the terminals of the secondary of an isolation transformer 18. The primary terminals of transformer 18 are connected by respective wires 19 and 20 to the alternating current supply wires, shown at 21 and 22. The output terminal 15 of bridge 11 is grounded. The output terminal 14 is connected through an amplifier 23 to the control electrode 24 of a tube 25 of the thyratron type. Designated at 31 is a wire connected to line wire 22. Designated at 32 is another wire connected to line wire 21. Connected in series across wires 31 and 32 are the respective resistors 26 and 27. The cathode of tube 25, shown at 28, is connected to the junction of resistors 26 and 27. Control grid 24 is connected to ground through the relatively high grid current limiting resistor 29. Designated at 30 is the winding of a relay controlling a device such as a heater, refrigerator, or the like, whose operation is to be controlled in accordance with temperature. One terminal of relay winding 30 is connected by a wire 33 to the anode 34 of tube 25. The other terminal of winding 30 is connected by a wire 34' to the wire 32. A condenser 35 may be connected across the relay winding 30.

Relay winding 30 is energized responsive to the firing of thyratron tube 25. As will be apparent from Figure 1, the anode-cathode circuit of tube 25, which includes the relay winding 30, is fed by raw alternating current from line wires 21 and 22 through the biasing resistor 26. The grid 24 has an alternating voltage bias thereon which is opposite in phase to the alternating voltage on the plate 34, said bias being sufficient in magnitude to normally prevent firing of the tube during periods when the plate is positive. When an alternating signal voltage is applied to grid 24 which is in phase with said bias voltage, the tube will therefore be non-conducting. However, when the alternating signal voltage on grid 24 is opposite in phase to said bias voltage, i. e., in phase with the voltage on plate 34 to a substantial degree and is of substantial magnitude, the tube may be triggered into conduction. In accordance with the well known characteristics of this type of tube, the tube will continue to conduct until the plate voltage drops below the value required to maintain the tube in a conducting state. Conduction occurs therefore during one half of each cycle of the alternating plate voltage.

Connected between terminals 12 and 14 of the bridge 11 is a first fixed resistor 37. Connected between terminals 13 and 14 is a second fixed resistor 38. Connected between terminals 12 and 15 is a temperature-sensitive resistor 39 of the thermistor type. Connected between terminals 15 and 13 is a manually adjustable variable resistor 40. Variable resistor 40 may be set to provide a null condition of the bridge 11. At this condition, no signal voltage is present across terminals 14 and 15. Resistor 39 has a negative temperature coefficient, i. e., its resistance decreases with a rise in temperature. Therefore, when the temperature changes from that at which the null condition was obtained, the bridge becomes unbalanced and a signal voltage appears across terminals 14 and 15. When the temperature decreases from the original value at which the null condition was obtained, the signal voltage has a substantial in-phase component with respect to the voltage on plate 34, causing the tube 25 to conduct and causing the relay winding 30 to become energized. Energization of relay winding 30 may initiate the operation of a heater, which furnishes heat to the system, causing the temperature to rise to the null value, whereupon the bridge 11 again becomes balanced, and the signal across terminals 14 and 15 is eliminated. This causes tube 25 to cease conducting and thereby allows the relay winding 30 to become deenergized, terminating operation of the heater. If the temperature should rise above the null value, a signal appears across terminals 14 and 15 which is out of phase with the voltage on plate 34, and the tube 25 is not triggered.

In order to render the bridge capable of being balanced, the capacitive reactance across the arms of the bridge must be made as small as possible. Therefore, the secondary of the isolation transformer must be suitably shielded so that the effective capacities between its respective terminals and ground will be very low, as well as substantially equal. Referring to Figures 5 and 6, it will be seen that the transformer 18 comprises a core 41 upon which is wound the primary winding 42. The core is secured at its end opposite winding 42 to the metal wall of its housing or to the metal chassis employed with the transformer, designated at 43. Secured on core 41 adjacent winding 42 is a metal shielding disc 44. Secured on the core 41 midway between disc 44 and the support element 43 is a relatively large insulating ring 45 on which is wound the flat annular secondary winding 46 of the transformer. The supporting element 43 is grounded. From Figure 6 it will be seen that the capacity to ground of the flat annular secondary winding 46 is relatively small, (of the order of 30 micromicrofarads), and since it is substantially midway between the members 43 and 44, the respective effective capacities to ground of the secondary terminals will be substantially equal. These effective capacities are shown in dotted view at 47, 47 in Figure 1.

Referring now to Figure 2, a first embodiment of a manually adjustable bridge suitable for use in the circuit of Figure 1 is disclosed. It will be seen that the bridge of Figure 2, designated generally at 11', has the input terminals 12 and 13 and the output terminals 14 and 15, corresponding to those of the bridge 11 in Figure 1. Connected between terminals 12 and 14 is a fixed resistor $R_{17}$. Connected between terminals 12 and 15 is another fixed resistor $R_{18}$. Connected across resistor $R_{18}$ is the thermistor $R_T$, which may be of the type manufactured by General Electric Company, Schenectady, New York, Model No. M-9,125,668, part No. 10, having a nominal resistance of 10,000 ohms at 25° centigrade. Connected between terminals 14 and 13 is a series circuit comprising a fixed resistor $R_{16}$, a variable tapped resistor $S_2$ and a variable resistor $RH_1$. Variable resistor $S_2$ comprises a rotatable switch arm 48 connected to resistor $R_{16}$ engageable with successive taps 49 to 54. Connected between the successive pairs of taps are the respective fixed resistors $R_{11}$ to $R_{15}$. The tap 49 is connected to the variable resistor $RH_1$.

Connected between terminals 13 and 15 is a variable tapped resistor $S_{1-1}$. Tapped resistor $S_{1-1}$ comprises a movable contact arm 55 engageable with successive taps shown at 56. Connected between the successive pairs of taps 56 are the respective fixed resistors $R_1$ to $R_{10}$. The end lead of $R_{10}$ is connected to terminal 13. Contact arm 55 is connected to terminal 15.

The following table lists the values which may be employed for the various resistors of the bridge of Figure 2:

| Resistor | Value in ohms |
|---|---|
| $R_1$ | 4,950. |
| $R_2$ | 7,550. |
| $R_3$ | 7,220. |
| $R_4$ | 5,500. |
| $R_5$ | 3,680. |
| $R_6$ | 2,290. |
| $R_7$ | 1,260. |
| $R_8$ | 740. |
| $R_9$ | 410. |
| $R_{10}$ | 800. |
| $R_{11}$ to $R_{15}$ | 1,780 each. |
| $R_{16}$ | 14,900. |
| $R_{17}$ | 14,900. |
| $R_{18}$ | 39,000. |
| $RH_1$ | zero to 2,000. |

Figure 3:
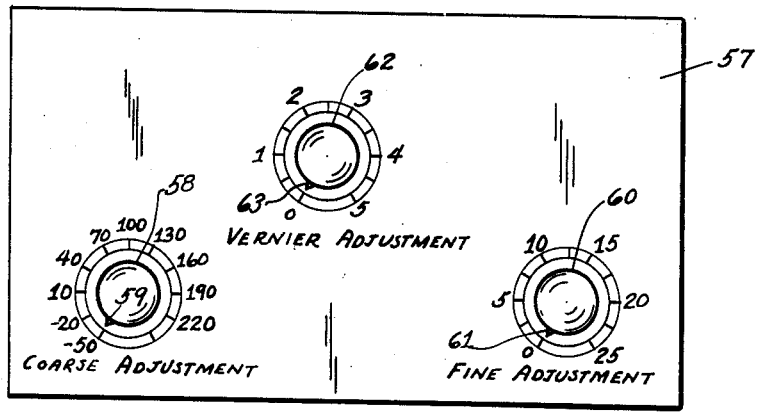
Figure 3 is a front elevational view of the control panel of a temperature-sensitive settable control device of the present invention.

The apparatus may be mounted in a suitable housing having a front panel such as shown at 57 in Figure 3. The coarse adjustment knob, shown at 58, controls the position of the movable switch arm 55 of the tapped resistor $S_{1-1}$. As will be seen from Figure 2, the switch arm 55 may have ten different positions, engaging the respective taps 56. Each position represents a temperature setting 30 degrees removed from an adjacent position. The knob 58 consequently is provided with a pointer 59 and the panel 57 is marked with a scale around knob 58 inscribed with successive 30 degree temperature steps from the lowest value, −50° F. to a high value, 220° F.

The fine adjustment knob, shown at 60, controls the position of movable switch arm 48 of the tapped resistor $S_2$. As will be seen from Figure 2, the switch arm 48 may have six different positions, engaging the respective taps 49 to 54. Each position represents a temperature setting 5 degrees removed from an adjacent position. The knob 60 consequently is provided with a pointer 61 and the panel 57 is marked with a scale around knob 60 inscribed with successive 5 degree temperature steps, from zero to 25 degrees, each marking corresponding to a particular position of switch arm 48.

The vernier adjustment knob, shown at 62, controls the position of the movable tap of the manually variable resistor $RH_1$. The knob 62 is provided with a pointer 63 and the panel 57 is marked with a scale around knob 62 inscribed in degrees of temperature from zero to 5 degrees.

The bridge 11' may be set to provide a null condition at any desired temperature by adjusting the knobs 58, 60 and 62 to respective positions whose sum yields the desired temperature. For example, if the null response is desired at 68° F., the coarse adjustment knob 58 is set so that pointer 59 is adjacent the 40 degree marking, the fine adjustment knob 60 is set so that its pointer 61 is adjacent the 25 degree marking, and the vernier adjustment knob 62 is set so that its pointer 63 is adjacent the 3 degree marking. Assuming the elements of the bridge to have the values above set forth, the bridge will be balanced when the thermistor $R_T$ is exposed to a temperature of 68° F. When the temperature is below the desired value, a signal voltage will appear on grid 24 in phase with the voltage on plate 34, as above explained, causing the tube 25 to conduct and causing the relay winding 30 to become energized. When the temperature is above the desired value, the signal voltage on grid 24 is opposite in phase to the plate voltage and the tube does not conduct.

As is well known, the resistance versus temperature characteristic of a thermistor is such that as the temperature of the thermistor decreases below a certain temperature, for example, approximately 40° F., the resistance of the thermistor increases much more rapidly than it increases with decrease in temperature at the upper portions of the temperature range. The respective temperature differentials required to balance the bridge corresponding to given changes in setting of the fine adjustment resistors $S_2$ and $RH_1$ should be maintained substantially constant over the entire temperature range covered by the instrument.

Referring to Figure 7, the curve 64 represents the temperature differential balancing characteristic of the fine adjustment resistor $S_2$ of a bridge such as shown in Figure 2 for different temperature settings over a temperature range from about —50° F. to 220° F. Due to the shape of the resistance-temperature characteristic of a thermistor, as above explained, the temperature differential balancing characteristic curve 64 of the bridge may be substantially flat from about 220° F. to about 40° F., and then will begin to curve sharply upwardly as the temperature settings decrease below 40° F. This means that at balance at a given temperature below 40° F. a five degree decrease in the setting of $S_2$ will require much more than a five degree decrease in temperature on the thermistor to restore balance, while at temperatures above 40° F., a five degree change in temperature on the thermistor will always be substantially equivalent to a five degree change in setting of $S_2$, with regard to balancing the bridge.

In order to compensate for the sharply rising resistance-temperature characteristic of the thermistor at low temperatures, the modified form of bridge, shown at 11'' in Figure 4 is employed. The bridge 11'' has the input terminals 12' and 13' and the output terminals 14' and 15'. Connected between terminals 12' and 15' is the fixed resistor $R_{18}$ and connected in parallel with resistor $R_{18}$ is the thermistor $R_T$. Connected between terminals 13' and 15' is the variable tapped resistor $S_{1-1}$, similar to that shown in Figure 2. Output terminal 15' is grounded. Connected between terminal 14' and terminal 13' is a circuit comprising the variable tapped resistor $S_2$ connected in series with the variable resistor $RH_1$, as in Figure 2, but also including a single-pole, multiple contact switch $S_{1-2}$ having a movable switch arm 65 selectively engageable with the stationary contacts 66 to 75. The contacts 68 to 75 are connected together by a conductor 77. Conductor 77 is connected through the fixed resistor $R_{16}$ to the movable pole 48 of tapped resistor $S_2$. Contact 67 is connected through another fixed resistor $R_{19}$ to the movable pole 48. Contact 66 is connected through still another fixed resistor $R_{20}$ to said movable pole 48.

Connected between terminals 14' and 12' is a resistor-selecting circuit comprising a selector switch $S_{1-3}$ having the fixed contacts 79 to 88 and the movable pole 78. Pole 78 is connected to terminal 14'. Contacts 81 to 88 are connected together by a conductor 90 which is connected through the fixed resistor $R_{17}$ to terminal 12'. Contact 80 is connected through another fixed resistor $R_{21}$ to terminal 12' and contact 79 is connected through still another fixed resistor $R_{22}$ to terminal 12'. The movable poles 55, 65 and 78 are ganged together for simultaneous rotation.

The resistors $R_1$ to $R_{18}$ have the same values given above in the description of the bridge 11' of Figure 2. The values of the resistors $R_{19}$ to $R_{22}$ are substantially higher than those of resistors $R_{16}$ and $R_{17}$ however, and may be in accordance with the following table:

| Resistor | Value in ohms |
|---|---|
| $R_{19}$ | 30,800. |
| $R_{20}$ | 64,200. |
| $R_{21}$ | 30,800. |
| $R_{22}$ | 64,200. |

A control panel similar to that employed for bridge 11' is employed for bridge 11''. The coarse adjustment knob then controls the position of poles 55, 65 and 78 simultaneously. The fine adjustment knob controls the position of pole 48, and the vernier adjustment knob controls the position of the movable tap of the variable resistor $RH_1$. Due to the connections of the fixed contacts of the selector switches $S_{1-2}$ and $S_{1-3}$, the fixed resistors $R_{17}$ and $R_{16}$ remain connected in the bridge circuit in the same manner as in Figure 2 for all coarse adjustment settings from the high temperature value of 220° F. to the 10° F. setting. The balancing temperature differential characteristic of the bridge will be defined by the curve 64 of Figure 7 at all settings of the control knobs in this range. When the coarse adjustment setting is changed to —20° F., the resistors $R_{19}$ and $R_{21}$ are substituted respectively for the resistors $R_{16}$ and $R_{17}$, placing the bridge on a lower characteristic curve, shown at 91 in Figure 7. This automatically compensates for the upward curvature of the balancing temperature differential characteristic at the lowered temperature. Since the fine adjustment tapped resistor $S_2$ and the vernier adjustment variable resistor $RH_1$ are located in the same arm of the bridge, similar temperature range compensation is provided for both fine and vernier adjustments. When the coarse adjustment setting is reduced still further to $-50°$ F., the resistors $R_{20}$ and $R_{22}$ are substituted for the resistors $R_{19}$ and $R_{21}$, placing the bridge on a still lower balancing temperature differential characteristic curve, shown at 92 in Figure 7. This automatically compensates for the upward curvature of the adjacent characteristic curve 91 at the further lowered temperature. The total effect of this substitution of resistors is to maintain the overall balancing temperature differential characteristic for fine and vernier adjustments of the bridge substantially flat over a range much greater than that obtained with the bridge of Figure 2.

While certain specific embodiments of temperature-responsive bridge circuits which are manually adjustable to give a predetermined response at any temperature setting over a range of temperature values, and specific values of the components thereof, have been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. A manually settable temperature responsive bridge circuit of the character described comprising a first arm, a second arm, a third arm and a fourth arm connected to define a Wheatstone bridge, the first arm comprising a plurality of fixed resistors and means for selectively connecting said resistors into said first arm, the second arm including a resistor having a substantially non-linear resistance-temperature characteristic, the third arm including a first tapped resistor, a movable contact selectively engageable with the taps of said first tapped resistor, a first operating member connected to said movable contact, and scale means associated with said first operating member marked off in coarse temperature steps, and the fourth arm including a second tapped resistor, a movable contact selectively engageable with the taps of said second tapped resistor, a second operating member connected to said latter movable contact, and scale means associated with said second operating member marked off in fine temperature steps, and means mechanically coupling said first operating member to the means for selectively connecting the fixed resistors into the first arm, said fixed resistors having respective different values and being arranged to compensate for the non-linearity of the resistance-temperature characteristic of the resistor in said second arm to substantially maintain the accuracy of calibration of the fine temperature step scale means over the temperatures where the said resistance-temperature characteristic is non-linear.

2. A manually settable temperature responsive bridge circuit of the character described comprising a first arm, a second arm, a third arm and a fourth arm connected to define a Wheatstone bridge, the first and fourth arms each including a plurality of fixed resistors and means for simultaneously selectively connecting said fixed resistors into said first and fourth arms, the second arm including a resistor having a substantially non-linear resistance-temperature characteristic, the third arm including a first tapped resistor, a movable contact selectively engageable with the taps of said first tapped resistor, a first operating member connected to said movable contact, and scale means associated with said first operating member marked off in coarse temperature steps, and the fourth arm including a second tapped resistor, a movable contact selectively engageable with the taps of said second tapped resistor, a second operating member connected to said latter movable contact, and scale means associated with said second operating member marked off in fine temperature steps, and means mechanically coupling said first operating member to the means simultaneously selectively connecting said fixed resistors into said first and fourth arms, said fixed resistors having respective different values and being arranged to compensate for the non-linearity of the resistance-temperature characteristic of the resistor in said second arm to substantially maintain the accuracy of calibration of the fine temperature step scale means over the temperatures where the said resistance-temperature characteristic is non-linear.

3. A manually settable temperature responsive bridge circuit of the character described comprising a first arm, a second arm, a third arm and a fourth arm connected to define a Wheatstone bridge, the first and fourth arms each including a plurality of fixed resistors and means simultaneously selectively connecting said fixed resistors into said first and fourth arms, the second arm including a resistor having a substantially non-linear resistance-temperature characteristic, the third arm including a first tapped resistor, a movable contact selectively engageable with the taps of said first tapped resistor, a first operating member connected to said movable contact, and scale means associated with said first operating member marked off in coarse temperature steps, and the fourth arm including a second tapped resistor, a movable contact selectively engageable with the taps of said second tapped resistor, a second operating member connected to said latter movable contact, scale means associated with said second operating member marked off in fine temperature steps, a variable resistor in series with said second tapped resistor, operating means for said variable resistor, and scale means associated with said last named operating means marked off in subdivisions of said fine temperature steps, and means mechanically coupling said first operating member to the means simultaneously selectively connecting said fixed resistors into said first and fourth arms, said fixed resistors having respective different values and being arranged to compensate for the non-linearity of the resistance-temperature characteristic of the resistor in said second arm to substantially maintain the accuracy of calibration of the fine temperature step scale means over the temperatures where the said resistance-temperature characteristic is non-linear.

4. A settable temperature responsive bridge of the character described, comprising four resistance arms connected to define a Wheatstone bridge, a first arm thereof including a thermistor having a substantially non-linear resistance-temperature characteristic, a second arm thereof including therein a first tapped resistor and a first movable contact selectively engageable with the taps of said first tapped resistor to thereby establish coarse temperature settings of the bridge, a third arm thereof including a variable resistor to establish fine temperature settings of the bridge, said third arm including in addition a first group of additional resistors of different values and first switch means arranged to selectively include one of the first additional resistors in said third arm, the fourth arm including a second group of additional resistors of different values and second switch means arranged to selectively include one of the second additional resistors in said fourth arm, means mechanically coupling the first switch means, the second switch means and the first movable contact together for simultaneous control, and means limiting switching action of said first and second switch means to high value switching steps of the first movable contact with respect to said first tapped resistor, whereby the same resistor of said first group remains in the third arm and the same resistor of said second group remains in the fourth arm at low value switching steps of the first movable contact, and other resistors are substituted in the third and fourth arms at high value switching steps of said first movable contact, said other resistors being formed and arranged to compensate for the non-linearity of the resistance-temperature characteristic of the thermistor and to maintain substantially constant at all temperatures the temperature differential required to balance the bridge corresponding to a given change in resistance of said variable resistor.

5. A settable temperature responsive bridge of the character described, comprising four resistance arms connected to define a Wheatstone bridge, a first arm thereof including a thermistor having a resistance-temperature characteristic which curves upwardly at low temperatures, a second arm thereof including therein a tapped resistor and a movable contact selectively engageable with the taps of said tapped resistor to thereby establish coarse temperature settings of the bridge, a third arm thereof including a variable resistor to establish fine temperature settings of the bridge, said third arm including in addition a first group of additional resistors of increasing values and first switch means arranged to selectively include one of the first additional resistors in said third arm, the fourth arm including a second group of additional resistors of increasing values and second switch means arranged to selectively include one of the second additional resistors in said fourth arm, means coupling the first switch means, the second switch means and the movable contact together for simultaneous control, and means limiting switching action of said first and second switch means to high value switching steps of the movable contact with respect to said tapped resistor, said latter means being formed and arranged to retain a relatively low value resistor of said first group in the third arm and a relatively low value resistor of said second group in the fourth arm at low value switching steps of the movable contact and to substitute higher value resistors in the third and fourth arms at high value switching steps of said movable contact, said higher value resistors being arranged to provide compensation for the non-linearity of the resistance-temperature characteristic of the thermistor and to maintain substantially constant at all temperatures the temperature differential required to balance the bridge corresponding to a given change in resistance of said variable resistor.

6. A manually settable temperature-responsive bridge circuit comprising four resistance arms connected to define a Wheatstone bridge, one of said arms including a resistor having a resistance-temperature characteristic which is non-linear at certain temperatures, a first manually variable resistor in one of the other arms, said first variable resistor being settable in coarse steps to values corresponding to respective temperatures, a second variable resistor in still another arm, a rheostat in said last-named arm settable in fine temperature steps, and means mechanically coupling said variable resistors, said means being arranged to vary the value of said second resistor solely at those settings of the first variable resistor corresponding to the temperatures at which said characteristic is non-linear and to maintain substantially constant at all temperatures the temperature differential required to balance the bridge corresponding to a given change in resistance of said rheostat.

7. A bridge circuit comprising four resistance arms connected to define a Wheatstone bridge, one of said arms including a resistor having a resistance-temperature characteristic which is linear over a first range of temperatures and which is non-linear over a second range of temperatures, a second arm including a first manually variable resistor settable in coarse steps to respective values corresponding to respective temperatures over both the first and second ranges, a third arm including a second manually variable resistor settable in fine steps to respective values corresponding to definite respective increments of temperature in a coarse step temperature interval between settings of the first manually variable resistor, respective additional variable resistors in the third and fourth arms of the bridge, and means mechanically coupling said additional variable resistors to the first manually variable resistor and arranged to vary said additional variable resistors when said first manually variable resistor is varied from settings corresponding to said first range of temperatures to settings corresponding to said second range, the variation of said additional variable resistors being in the same direction as and compensating for the non-linear variation of the said resistance-temperature characteristic and being arranged to maintain substantially constant over both temperature ranges the temperature differential required to balance the bridge corresponding to a given change in resistance of said second manually variable resistor.

ROBERT E. HADADY.

References Cited in the file of this patent

UNITED STATES PATENTS

| Number | Name | Date |
|---|---|---|
| 1,324,818 | Hazard | Dec. 16, 1919 |
| 1,969,072 | Griffiths | Aug. 7, 1934 |
| 2,108,146 | Simpson | Feb. 15, 1938 |
| 2,193,762 | Hirsch | Mar. 12, 1940 |
| 2,246,575 | Coleman | June 21, 1941 |
| 2,465,683 | Griesheimer | Mar. 29, 1949 |
| 2,533,286 | Schmitt | Dec. 12, 1950 |